United States Patent [19]
Ushiyama et al.

[11] Patent Number: 6,156,973
[45] Date of Patent: Dec. 5, 2000

[54] FOAM COVERED TUBE FOR WIRING HARNESSES

[75] Inventors: Keiji Ushiyama; Yoshihisa Serizawa, both of Shizuoka, Japan

[73] Assignee: Yazaki Corporation, Tokyo, Japan

[21] Appl. No.: 09/106,286

[22] Filed: Jun. 29, 1998

[30] Foreign Application Priority Data

| | | | |
|---|---|---|---|
| Jun. 30, 1997 | [JP] | Japan | 9-174926 |
| Nov. 14, 1997 | [JP] | Japan | 9-313299 |
| Jun. 25, 1998 | [JP] | Japan | 10-179329 |

[51] Int. Cl.⁷ ................................................. H02G 3/04
[52] U.S. Cl. .................. 174/68.3; 177/70 R; 177/101.5; 177/136
[58] Field of Search .................. 174/68.3, 68.1, 174/70 R, 101.5, 110 R, 110 P, 110 F, 136

[56] References Cited

U.S. PATENT DOCUMENTS

| | | | |
|---|---|---|---|
| 3,092,530 | 6/1963 | Plummer | 154/44 |
| 4,438,056 | 3/1984 | Bast | 264/45.2 |
| 4,458,723 | 7/1984 | Nojiri et al. | 138/149 |
| 4,644,977 | 2/1987 | Arterburn | 138/137 |
| 4,874,648 | 10/1989 | Hill et al. | 428/35.9 |
| 4,970,351 | 11/1990 | Kirlin | 174/68.3 |

*Primary Examiner*—Kristine Kincaid
*Assistant Examiner*—W. David Walkenhorst
*Attorney, Agent, or Firm*—Armstrong, Westerman, Hattori, McLeland & Naughton

[57] ABSTRACT

A tube for wiring harnesses consists of a cylindrical body for passage therethrough of a terminal-attached cable branched from a wiring harness, the cylindrical body being made of a foamed flexible sheet having a multiplicity of minute bubbles; and a cover means which smoothens an inner circumferential surface of the cylindrical body along which the terminal-attached cable slides when passing through the cylindrical body. A smooth sliding advancement of the terminal-attached cable through the tube is attained.

11 Claims, 20 Drawing Sheets

FIG. 14
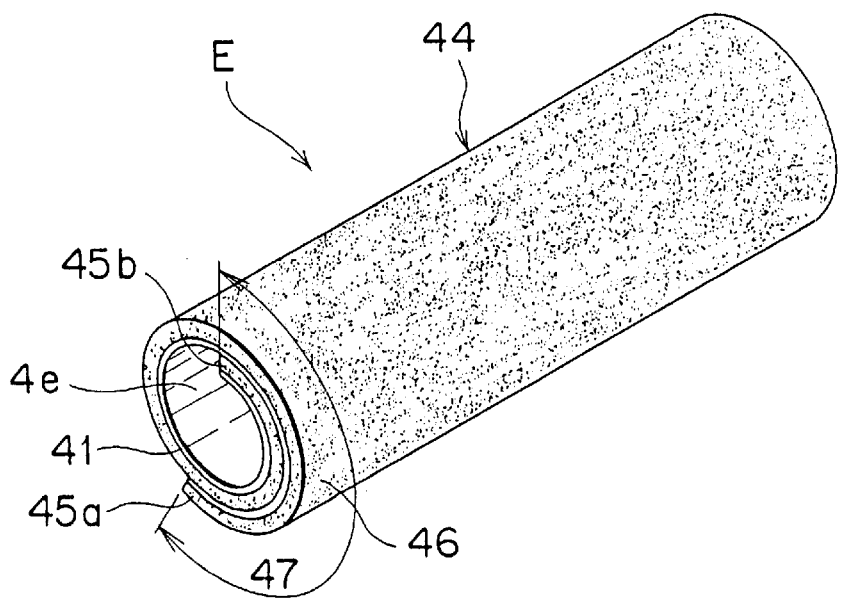
FIG. 15
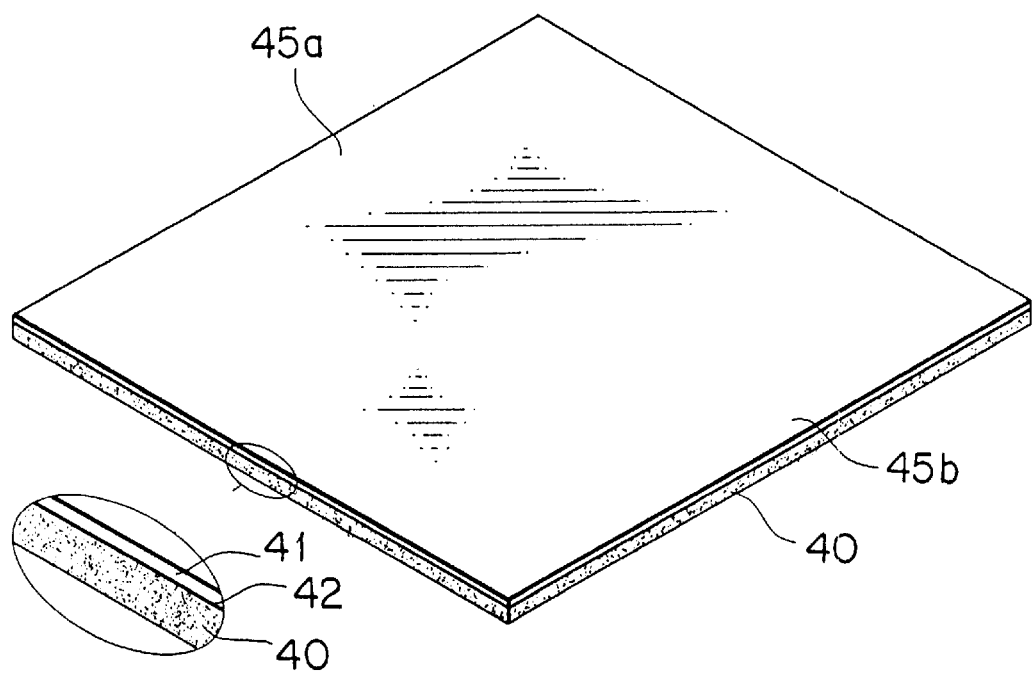
FIG. 15A

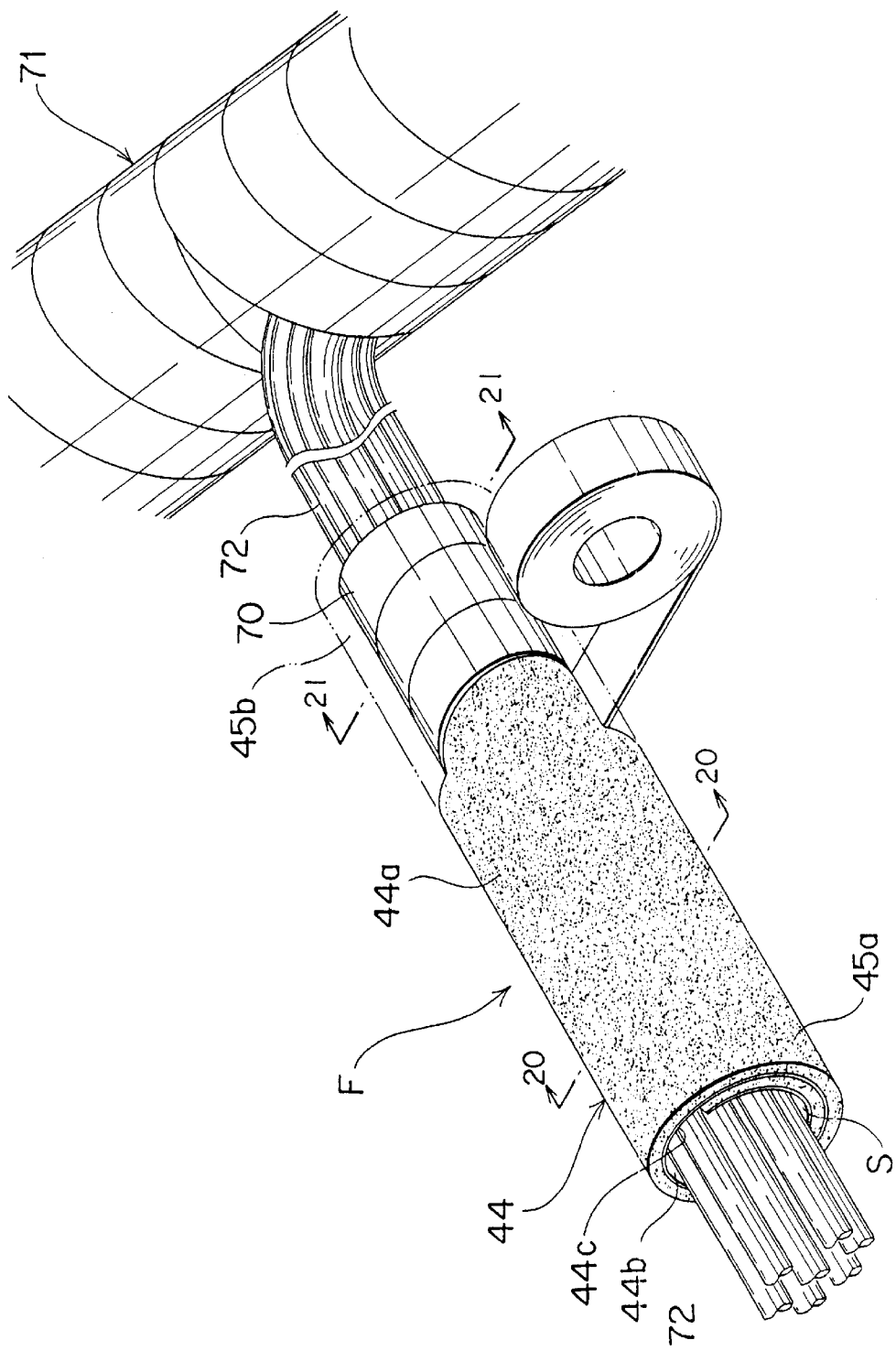

FOAM COVERED TUBE FOR WIRING HARNESSES

BACKGROUND OF THE INVENTION

1. Field of the Invention

This invention relates to a tube for wiring harnesses which is fitted over a cable or cables of a wiring harness for protecting the same and/or preventing noises caused by the hitting of the cables with each other, and more particularly to a tube for wiring harnesses which is improved in fittability over the cable or cables of a wiring harness.

2. Description of the Related Art

As shown in FIG. 29, a wiring harness 50 consists of a trunk 51 and a plurality of cables 55 branched from the trunk 51. The cables 55 each has a terminal 59 attached at the end which is received and locked in a connector housing 54 to form a connector 54'.

The plurality of cables 55, however, are loose at between the trunk 51 and the connector 54' and caused to hit each other, resulting in noises and damages to their sheaths.

Thus, to prevent the noises and damages to the cables' sheaths, a sheet 56 for wiring harnesses is conventionally used. The sheet 56, as shown in FIG. 19, has a multiplicity of minute bubbles 57 inside and is on one surface coated with an adhesive 58. The plurality of loose cables 55 are placed at a center on the adhesive-coated surface of the sheet 56, followed by folding the sheet 56 into halves to bundle the cables 55 therebetween. The noises and damages to the cables' sheaths are thus prevented.

The sheet 56, however, entails a drawback that its halves, once applied to each other, are troublesome to separate, especially when applied erroneously or slantwise, making the sheet unsuited for reuse. Thus, wasteful labor and time have been required in the folding operation of the sheet 56.

As a countermeasure to the above, as shown in FIG. 32, a tube 60 for wiring harnesses of a foamed and flexible material having a multiplicity of minute bubbles 57 (FIG. 31) has been used in place of the sheet 56. A cable or cables 55 each with a terminal 59 are inserted through the tube 60 to be protected therein and to subsequently bring the terminal 59 into locked position in the connector housing 54.

There is a drawback, however, to the conventional tube 60 for wiring harnesses that the terminal 59, during its sliding advancement through the tube, get caught in the irregularities on the inner circumferential surface 61 of the tube formed by the multiplicity of bubbles 57 (FIG. 31), obstructing a smooth advancement of the terminal through the tube.

If in this case the terminal 59 is forcibly pushed in, deformations of the terminal 59 and/or damages to the tube 60 will be caused. Further, the terminal 59 forcibly pushed in will shave the inner circumferential surface 61 of the tube 60 to produce shavings which will possibly stick to the terminal 59 and cause a contact failure.

SUMMARY OF THE INVENTION

This invention has been accomplished to overcome the above drawbacks and an object of this invention is to provide a tube for wiring harnesses which enables a terminal to be smoothly inserted therethrough and/or which protects therein a cable or cables constituting a wiring harness.

In order to attain the object, according to an aspect of this invention, there is provided a tube for wiring harnesses which comprises: a cylindrical body for passage therethrough of a terminal-attached cable branched from a wiring harness, the cylindrical body being made of a foamed flexible sheet having a multiplicity of minute bubbles; and a cover means which smoothens, i.e., makes even and uncorrugated, or longitudinally even, an inner circumferential surface of the cylindrical body along which the terminal-attached cable slides when passing through the cylindrical body.

In the tube for wiring harnesses of the above construction, because the cover means provides a smooth slide surface for the terminal attached to the cable, the terminal, when passing through the cylindrical body, does not catch in the irregularities on the inner circumferential surface thereof formed by the bubbles, thereby allowing a smooth sliding advancement of the terminal-attached cable.

Preferably, the cover means comprises an applied film covering the inner circumferential surface of the cylindrical body.

Advantageously, the applied film is of polyester.

Preferably, the cover means comprises a coated layer covering the inner circumferential surface of the cylindrical body.

Advantageously, the coated layer comprises a flexible settable adhesive or a flexible resin.

Preferably, the cover means comprises a layer covering the inner circumferential surface of the cylindrical body, which is provided by fusing a surface of the sheet constituting the inner circumferential surface of the cylindrical body at a temperature over a softening temperature thereof and allowing the surface of the sheet to cool.

Advantageously, the surface of the sheet is applied with a pressure while being fused to provide the layer.

Preferably, the applied film which covers the inner circumferential surface of the cylindrical body has a high heat shrinkability and thermosettability and becomes larger in thickness when heated and thereafter cooled.

Advantageously, the applied film and thus the cylindrical body are used to directly cover an electric component such as a connector.

Preferably, the cylindrical body with the applied film is extended in accordance with a laying path of a wiring harness and is heated and thereafter cooled to be put in a shape following the laying path of the wiring harness.

According to another aspect of this invention, there is provided a tube for wiring harnesses which comprises: a cylindrical body for fitting over a cable, the cylindrical body being made of a foamed flexible sheet having a multiplicity of minute bubbles; and a flexible film applied to one surface of the foamed flexible sheet, the film having heat shrinkability, wherein the foamed flexible sheet with the flexible film is heated and thereafter cooled such that shrinkage of the flexible film causes the foamed flexible sheet to spontaneously roll into the cylindrical body.

In the tube for wiring harnesses of the above construction, because the foamed flexible sheet having on one surface the heat shrinkable film is heated, the heat shrinkable film shrinks to cause the foamed flexible sheet to spontaneously roll on the heat shrinkable film side into a cylindrical shape and into the cylindrical body.

Preferably, the cylindrical body has an overlap portion in which circumferentially opposite end portions thereof overlap each other.

Preferably, a dimension of the overlap portion in a circumferential direction of the cylindrical body is optionally settable.

Advantageously, the flexible film is of polyester.

Preferably, the tube for wiring harnesses further comprises a thin, flexible adhesive tape wound around an outer peripheral wall of the cylindrical body.

Preferably, the adhesive tape is wound around such that the cylindrical body is reduced in diameter at a portion where the adhesive tape is wound.

Preferably, the adhesive tape is wound around opposite end portions of the cylindrical body.

Preferably, the adhesive tape is wound around an intermediate portion of the cylindrical body.

Preferably, the adhesive tape is wound around the cylindrical body in a bellows-like manner between opposite end portions of the cylindrical body.

The above and other objects, features and advantages of this invention will become apparent from the following description and the appended claims, taken in conjunction with the accompanying drawings.

BRIEF DESCRIPTION OF THE DRAWINGS

FIG. 14 is a perspective view of a tube for wiring harnesses according to a fifth embodiment of this invention;

FIG. 15 is a perspective partially enlarged view of a sheet for preparing the tube of FIG. 14;

FIG. 18 is a perspective view of a tube for wiring harnesses according to a sixth embodiment of this invention;

DESCRIPTION OF THE PREFERRED EMBODIMENTS

Embodiments of this invention will now be described with reference to the attached drawings. In the following embodiments, description is made of the cases where tubes of the same material as that of the described related art are used. This invention, however, is also applicable where tubes of other material are used.

Figure 1:
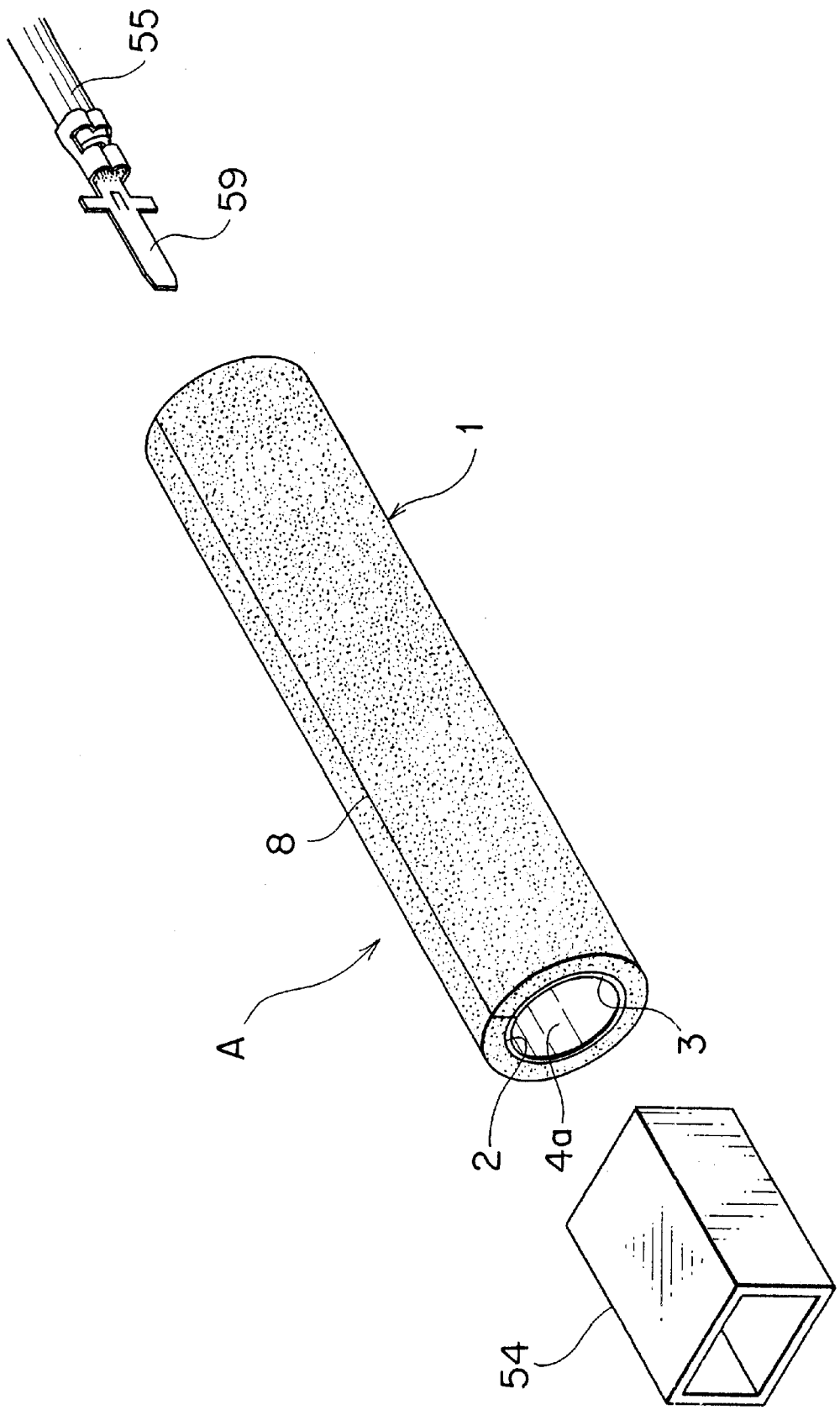
FIG. 1 is a perspective view of a tube for wiring harnesses according to a first embodiment of this invention.
Figure 2:
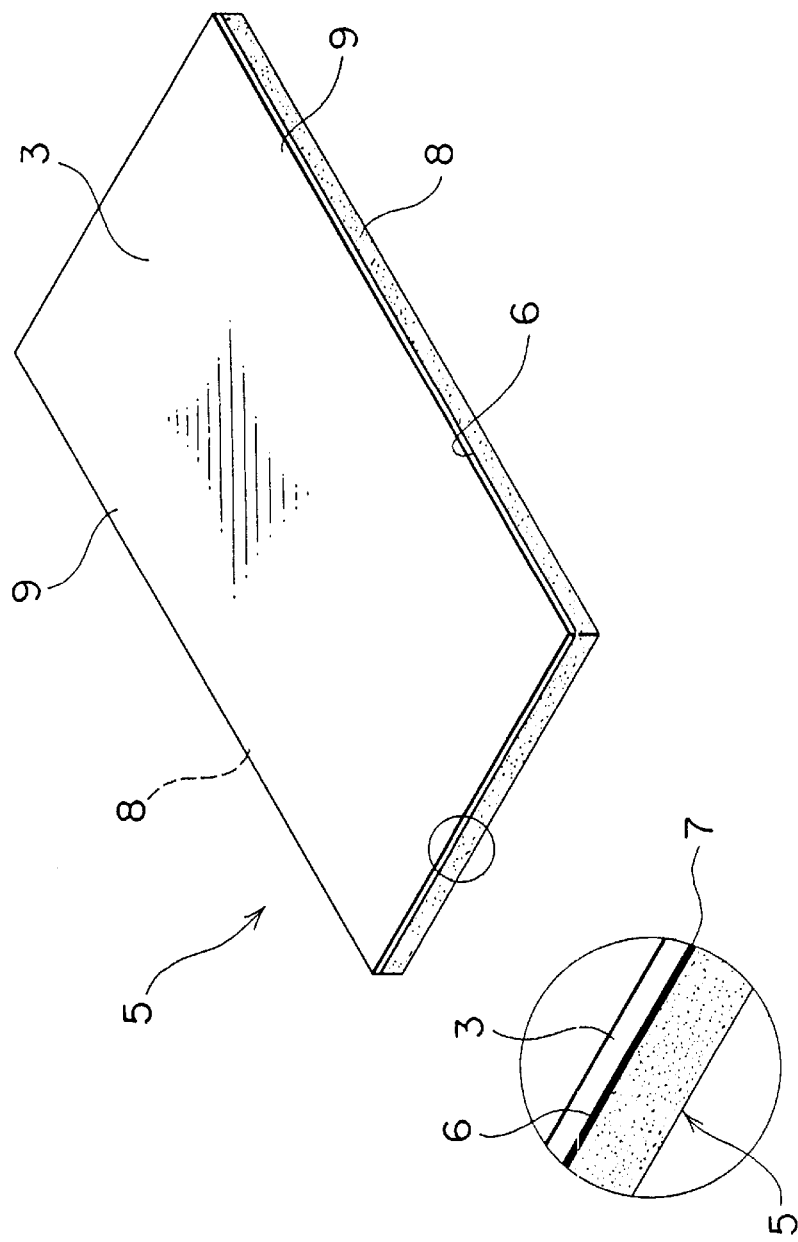
FIG. 2 is a perspective partially enlarged view of a sheet for preparing the tube of FIG. 1.
Figure 3:
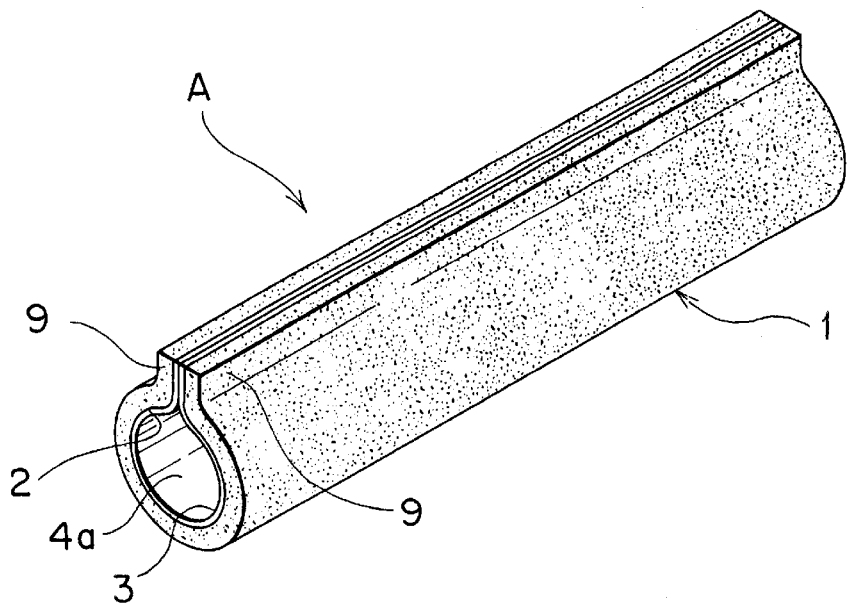
FIG. 3 is a perspective view of one example of a tube obtained by rolling the sheet of FIG. 2.

FIGS. 1 to 3 show a tube for wiring harnesses according to a first embodiment of this invention.

In FIG. 1, a tube A consists of a cylindrical body 1 and a thin layer 3 applied to an inner circumferential surface 2 of the cylindrical body 1 to provide a smooth slide surface 4a for a terminal 59. The thin layer 3 is made of a flexible thin film as of polyester. A plurality of cables 55 are branched from a trunk 51 of a wiring harness 50 (see FIG. 18) and have respective terminals 59 attached to their ends.

The thin layer 3 is adhered or welded to the inner circumferential surface 2 of the cylindrical body 1. To attain this, the cylindrical body 1 is, for example, cut and unrolled into a flat shape, adhered or welded on its unrolled surface with the thin layer 3, and restored into the original cylindrical shape. Alternatively, as shown in FIG. 2, the thin layer 3 is applied via an adhesive 7 or welding to an upper surface 6 of a sheet 5 which constitutes the cylindrical body 1, followed by rolling the sheet into a cylindrical shape. The use of the thin layer 3 does not adversely affect the flexibility of the sheet 5 itself. The material for the film is advantageously selected from those which will not cause noises on contacting the cable 55 or its terminal 59 in use.

The sheet 5 is rolled into a cylindrical shape, with the thin layer 3 thereon located on the inner side. Thereafter, circumferentially opposite end surfaces 8, 8 of the sheet 5 or opposite inner surfaces 9, 9 adjacent to the respective end surfaces 8, 8 are adhered or welded to each other to form the tube A (FIGS. 1 and 3). Thus, the thin layer 3 applied to the inner circumferential surface 2 of the cylindrical body 1 provides a smooth slide surface 4a for the terminal 59 of the wire 55, preventing the terminal 59 from catching in the irregularities on the inner circumferential surface 2 formed by the bubbles.

FIGS. 4 to 7 show a tube for wiring harnesses according to a second embodiment of this invention. In these figures, like parts or elements as in the first embodiment are denoted by like reference characters and their detailed description will be omitted.

Figure 4:
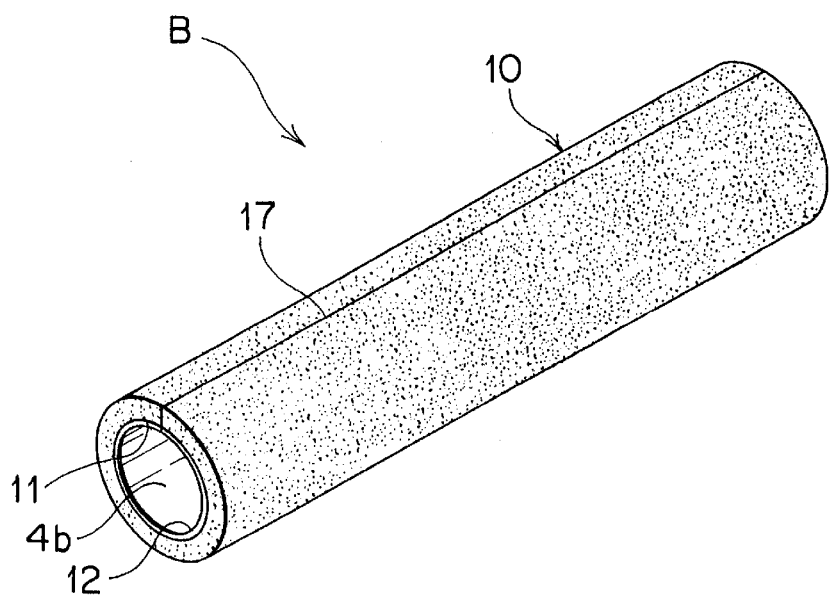
FIG. 4 is a perspective view of a tube for wiring harnesses according to a second embodiment of this invention.
Figure 5:
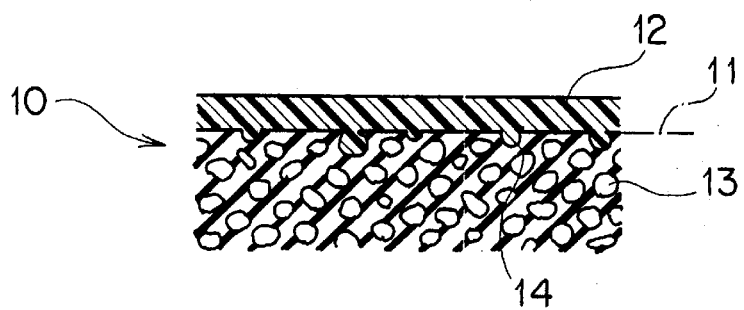
FIG. 5 is an enlarged sectional view of a part of the tube of FIG. 4.

In FIG. 4, a tube B for wiring harnesses has a thin layer 12 coated on an inner circumferential surface 11 of a cylindrical body 10 to provide a smooth slide surface 4b. The thin layer 12 is formed by coating with a flexible setting adhesive or a flexible resin. The flexible setting adhesive or flexible resin (not shown) is directly flown onto 'the inner circumferential surface 11 of the cylindrical body 10 to form, as shown in FIG. 5, a thin layer 12 on the inner circumferential surface 11 which fills in concaves 14 on the latter formed by the bubbles 13. A smooth slide surface 4b for the terminal 59 is thus provided.

Figure 6:
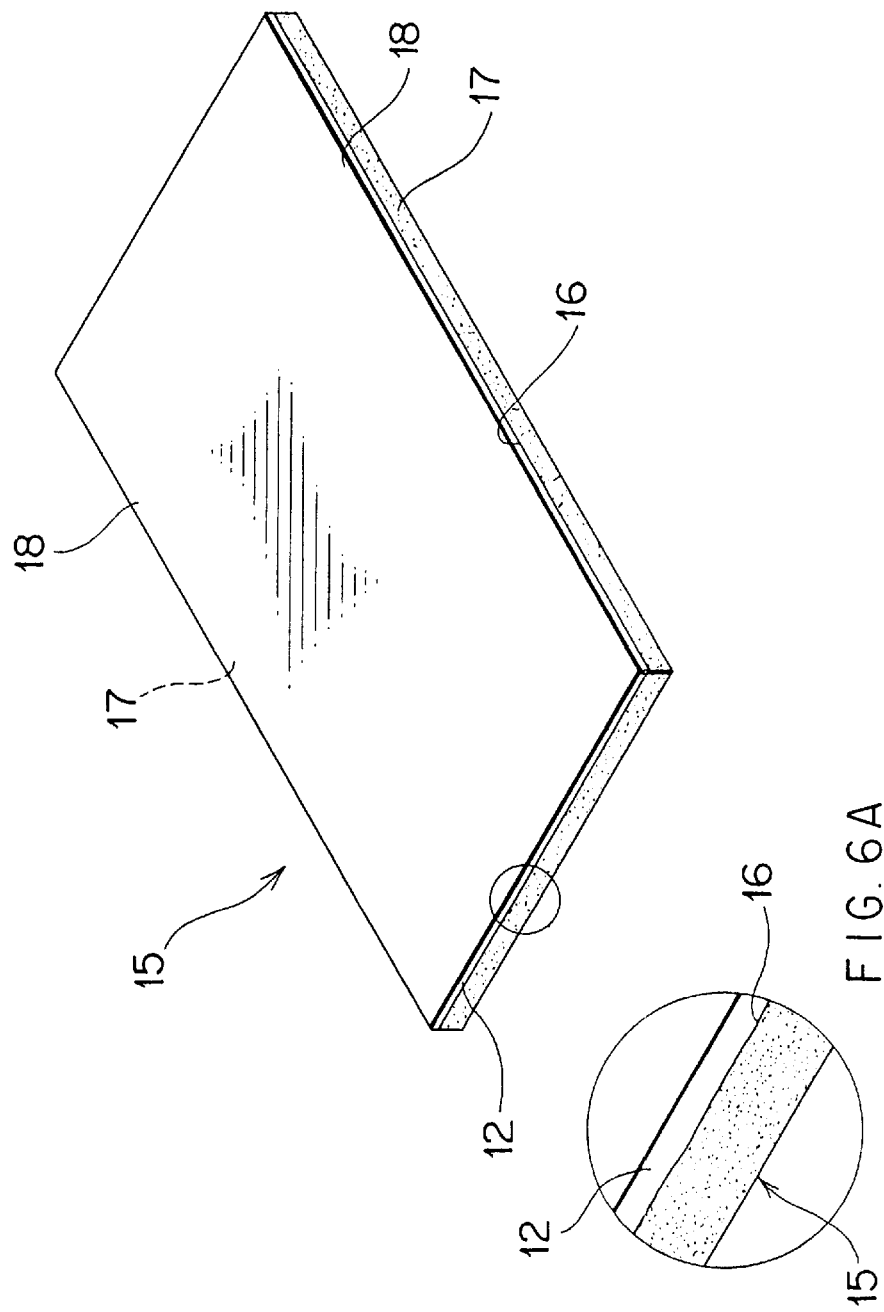
FIG. 6 is a perspective partially enlarged view of a sheet for preparing the tube of FIG. 4.

Alternatively, instead of directly flowing onto the inner circumferential surface 11 of the cylindrical body 10, the adhesive or flexible resin, as shown in FIG. 6, is first coated on an upper surface 16 of a sheet 15 to form the thin layer 12, followed by rolling the sheet 15 into a cylindrical shape. The thin layer 12 on the upper surface 16 of the sheet 15 does not adversely affect the flexibility of the sheet 15 itself.

Figure 7:
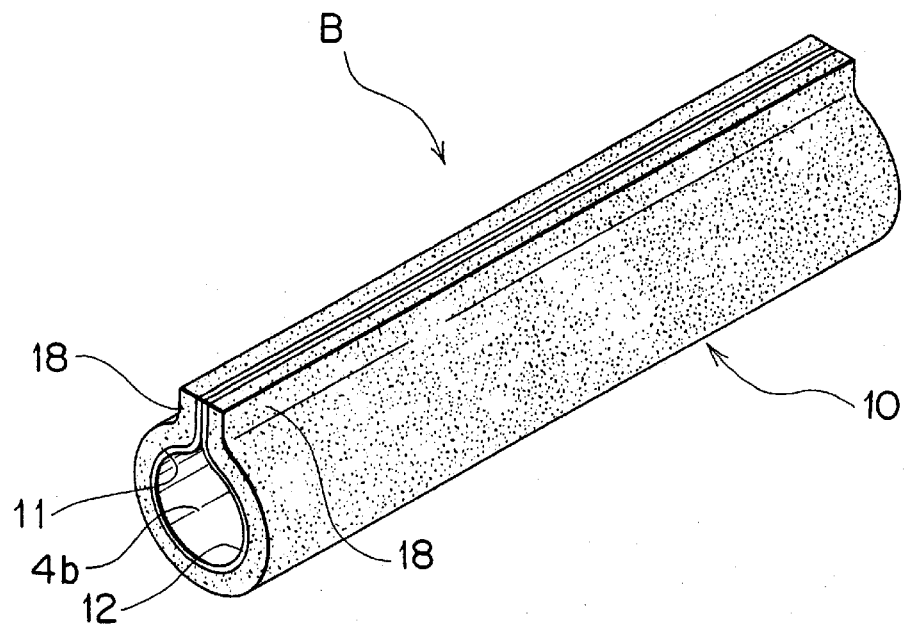
FIG. 7 is a perspective view of one example of a tube obtained by rolling the sheet of FIG. 6.

The sheet 15 is rolled into a cylindrical shape, with the coated thin layer 12 located on the inner side, and then its circumferentially opposite end surfaces 17, 17 or opposite inner surfaces 18, 18 adjacent to the respective end surfaces 17, 17 are adhered or welded together to provide the tube B (FIGS. 4 and 7). The thin layer 12 coated on the inner cylindrical surface 11 of the cylindrical body 10 thus provides a smooth guide surface for the terminal 59 and prevents the terminal 59 from catching in the irregularities on the inner circumferential surface 11 of the cylindrical body 10 during its passage therethrough.

Figure 8:
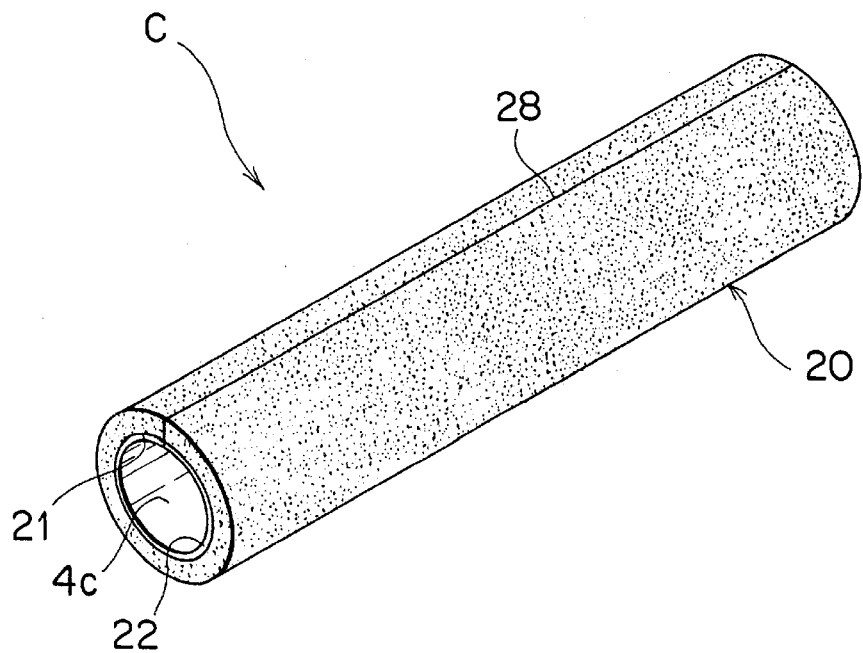
FIG. 8 is a perspective view of a tube for wiring harnesses according to a third embodiment of this invention.
Figure 9:
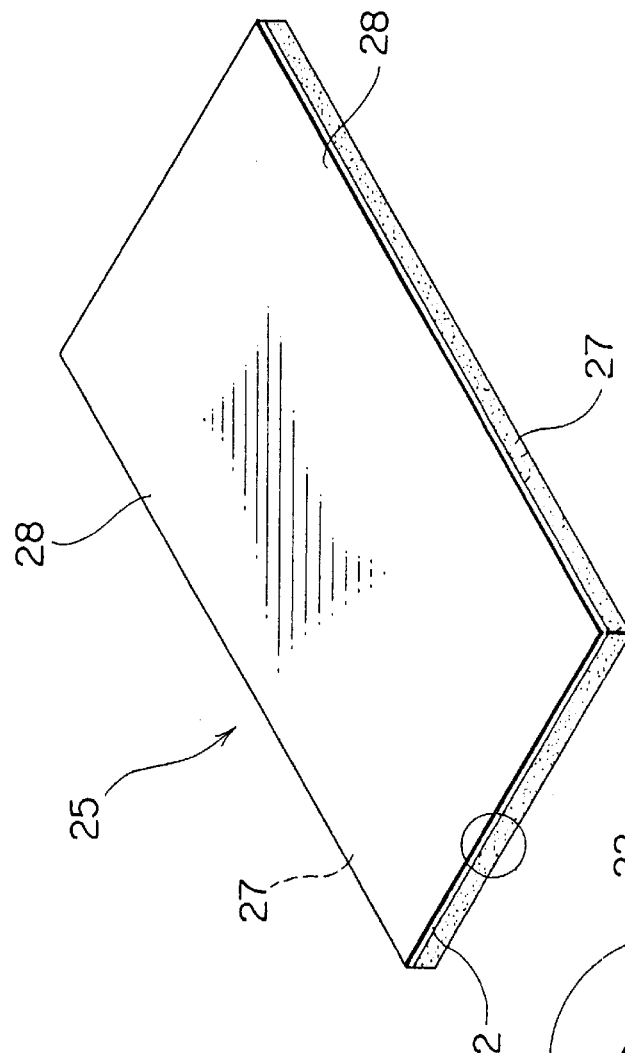
FIG. 9 is a perspective partially enlarged view of a sheet for preparing the tube of FIG. 8.
Figure 9A:
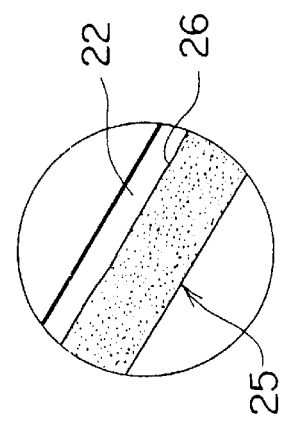
Figure 10:
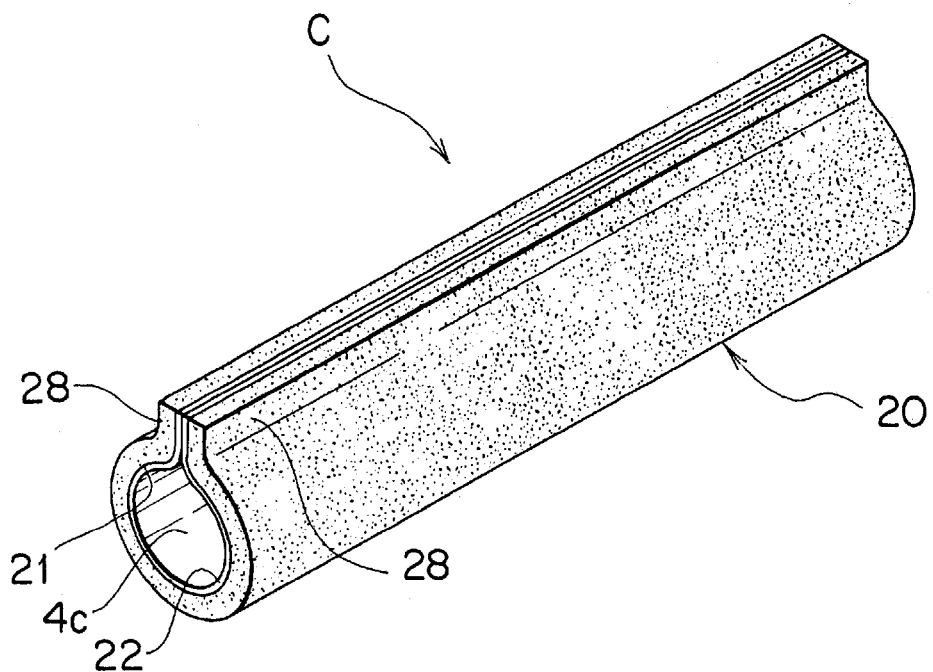
FIG. 10 is a perspective view of one example of a tube obtained by rolling the sheet of FIG. 9.

FIGS. 8 to 10 show a tube for wiring harnesses according to a third embodiment of this invention. In these figures, like parts or elements as in the first embodiment are denoted by like reference characters and their detailed description will be omitted.

In FIG. 8, a tube C for wiring harnesses has a set layer 22 formed by fusing an inner circumferential surface 21 of a cylindrical body 20 at a temperature over the softening temperature thereof. The set layer 22 provides a smooth slide surface 4c for the terminal 59.

By fusing with a heat generator such as a heating coil a sheet 25 (FIG. 9) at the upper surface 26 side at a temperature over the softening temperature thereof, the irregularities on the upper surface 26 formed by the bubbles 13 (FIG. 5) are evened to provide a smooth slide surface in the cylindrical body 20. Because the fusing is effected only at the upper surface 26 side of the sheet 25, the sheet undergoes no changes in quality at portions other than those adjacent to the upper surface 26. The upper surface 26 of the sheet 25 is then cooled and set to provide the set layer 22. Advantageously, a pressure is applied to the upper surface 26 of the sheet 25 concurrently with fusing the same, which pressure can be a wind pressure or the like.

The sheet 25 is then rolled into a cylindrical shape, with the set layer 25 located on the inner side, and then its circumferentially opposite end surfaces 27, 27 or opposite inner surfaces 28, 28 adjacent to the respective end surfaces 27, 27 are adhered or welded together to provide the tube C (FIGS. 8 and 10).

The set layer 22 thus provides a smooth guide surface 4c which enables the passage of the terminal 59 through the cylindrical body 20 without catching in the irregularities on the inner circumferential surface 21 formed by the bubbles 13 (FIG. 5).

Thus, according to the first, second or third embodiment of this invention, the terminal 59 can be easily and smoothly inserted through the tube A, B or C into position in the connector housing 54, as compared with the described related art.

Incidentally, in the present invention, any optional means other than those described in the preceding embodiments are also usable insofar as capable of smoothening the inner circumferential surface 2, 11, 21 of the cylindrical body 1, 10, 20.

Figure 11:
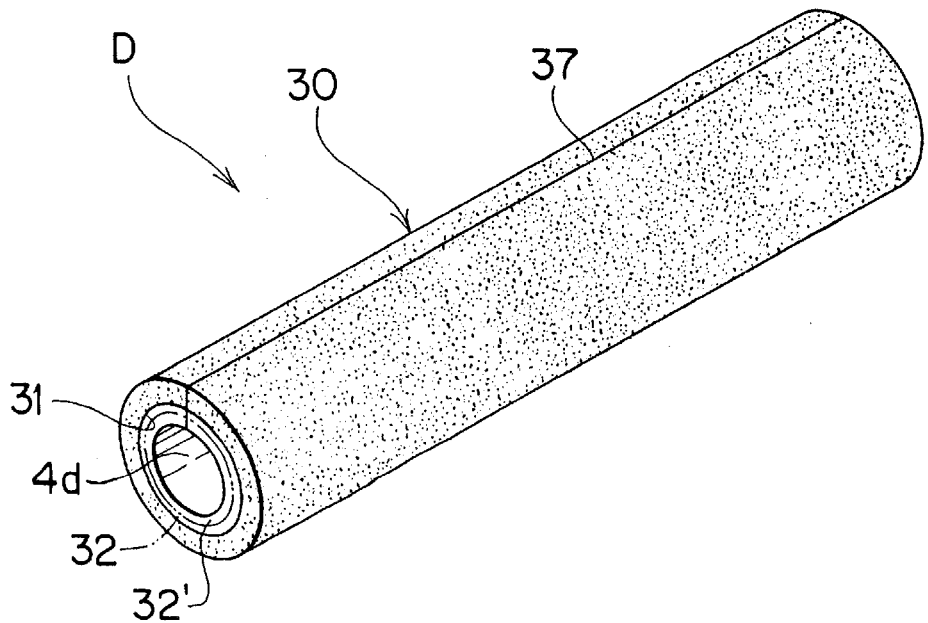
FIG. 11 is a perspective view of a tube for wiring harnesses according to a fourth embodiment of this invention.
Figure 12:
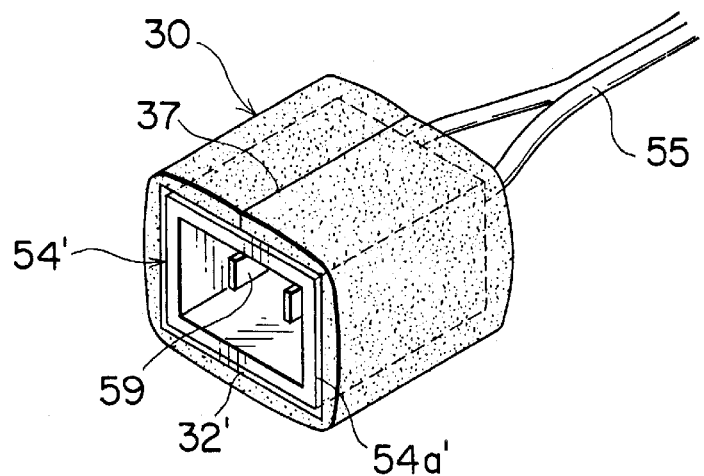
FIG. 12 is a perspective view of the tube for wiring harnesses of FIG. 11 used to cover outer peripheral walls of a connector.
Figure 13:
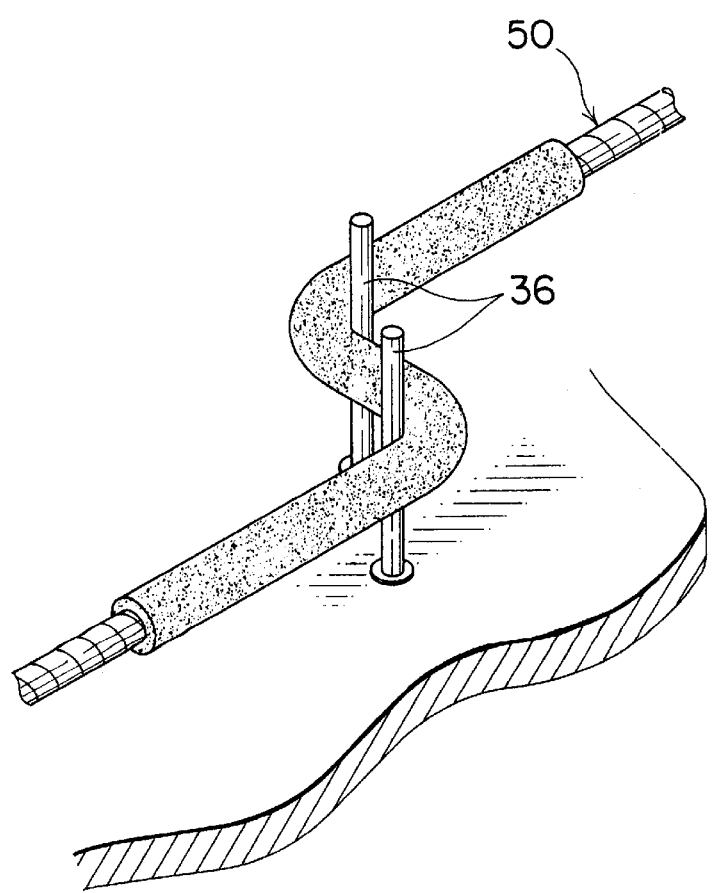
FIG. 13 is a perspective view of the tube for wiring harnesses of FIG. 11 extended in accordance with the laying path of a wiring harness.

FIGS. 11 to 13 show a tube for wiring harnesses according to a fourth embodiment of this invention.

In FIG. 11, a tube D for wiring harnesses has a thin layer 32 applied to an inner circumferential surface 31 of a cylindrical body 30. The thin layer 32 has a high heat shrinkability and thermosettability, and becomes larger in thickness as indicated at 32' when heated and thereafter cooled to provide a smooth slide surface 4d for the terminal 59. Examples of the layer 32 include a polyolefin layer.

Due to its high heat shrinkability, as mentioned above, the thin layer 32 becomes large in thickness on its heating and subsequent cooling as compared with that prior to the heating. As a result, the tube D is improved, by the degree of thickness increased, in the capability of protecting the terminal-attached wire 55 and, in the case of two or more terminal-attached wires 55 passed, in the capability of preventing the noises casued by the contacting of the wires 55 with each other. An improvement is also made in the abrasion resistance of the layer 32 against the terminal 59 due to its properties as mentioned above. Further, because the heat shrinkability and thermosettability have relation to the thickness of the layer 32 after the heating and subsequent cooling, the degree of its abrasion resistance against the terminal 59 can be optionally set. The method of applying the thin layer 32 to the inner circumferential surface 31 of the cylindrical body 30 is the same as in the second embodiment, and its description is omitted. Denoted 37 are end surfaces corresponding to those at 17 in the second embodiment.

There will now be given two examples of applications of the cylindrical body 30 having on its inner circumferential surface 31 the thin layer 32 which has a high heat shrinkability and thermosettability and becomes thicker when heated and thereafter cooled.

1) As shown in FIG. 12, the tube D is wrapped, for example, around outer peripheral walls 54a' of a connector 54' as an electric component, the tube D consisting of the cylindrical body 30 and the thin layer 32 applied on the inner circumferential surface 31 thereof. The tube D, when heated and cooled, becomes larger in thickness as indicated at 32' to thereby closely contact the outer peripheral walls 54a' of the connector 54'.

2) As shown in FIG. 13, the tube D—which consists of the cylindrical body 30 and the thin layer 32 applied to the inner circumferential surface 31 thereof—is extended along a plurality of guide bosses 36 arranged on a jig (not shown) in accordance with the laying path of a wiring harness 50. The tube D, if heated and cooled in this condition, is set in the shape following the laying path of the wiring harness 50 and becomes capable of performing also the function of a conventional protector (not shown) for protecting the wiring harness 50, thereby putting the protector into disuse.

As is apparent from the two examples as mentioned above, due to the high heat shrinkability and thermosettability which the thin layer 32 on the inner circumferential surface 31 of the cylindrical body 30 possesses, the tube D has the function of protecting the cable 55, the function of preventing the noises caused by the contacting of the cables 55 with each other, and the function of being formed into a shape corresponding to outer peripheral walls (54*a*') of an electric component (54') or to the laying path of a wiring harness (50). As a result, the tube D is improved in versatility as compared with the conventional one. In addition, owing to the cylindrical body 30 which is cheap, the production cost of the tube D is reduced as compared with the conventional one.

FIGS. 14 to 17 show a tube for wiring harnesses according to a fifth embodiment of this invention.

In FIGS. 14 and 15, a tube E for wiring harnesses consists of a sheet 40 and a thin film 41 applied to one surface of the sheet 40, the film 41 having flexibility and a higher heat shrinkability than that of the sheet 40 so that, when heated and thereafter cooled, the sheet 40 rolls spontaneously into a cylindrical shape, with the film 41 being located on the inner side to provide the tube E. The film 41 provides a slide surface 4*e* for the terminal 59. As in the preceding embodiments, the sheet 40 is made of foamed and flexible material having a multiplicity of minute bubbles (as shown at 13 in FIG. 5). Examples of the film 41 include a polyester film. Denoted 42 is an adhesive or the like for applying the film 41 to the sheet 40.

As is apparent from the above, a difference in heat shrinkability between the sheet 40 and the film 41 is used by heating. In other words, due to the higher heat shrinkability of the film 41, when the sheet 40 with the film 41 is allowed to cool after heating, the sheet 40 gradually spontaneously rolls on the side of the film 41 and into the tube E. On completion of the cooling, an overlap portion 46 is formed in which circumferentially opposite end portions 45*a*, 45*b* of the tube E overlap each other. The circumferential dimension 47 of the overlap portion 46 is decided by the largeness of the difference in heat shrinkability between the sheet 40 and the film 41, and thus by suitably selecting the largeness of such difference, the circumferential dimension 47 of the overlap portion 46 can be adjusted.

Because no external force is acting on the tube E in the direction of its closure, it can be easily opened by hand at the overlap portion 46. Further, due to the resilient force of the tube E opened, when hand is put off, the tube E spontaneously returns to its original position.

Figure 16:
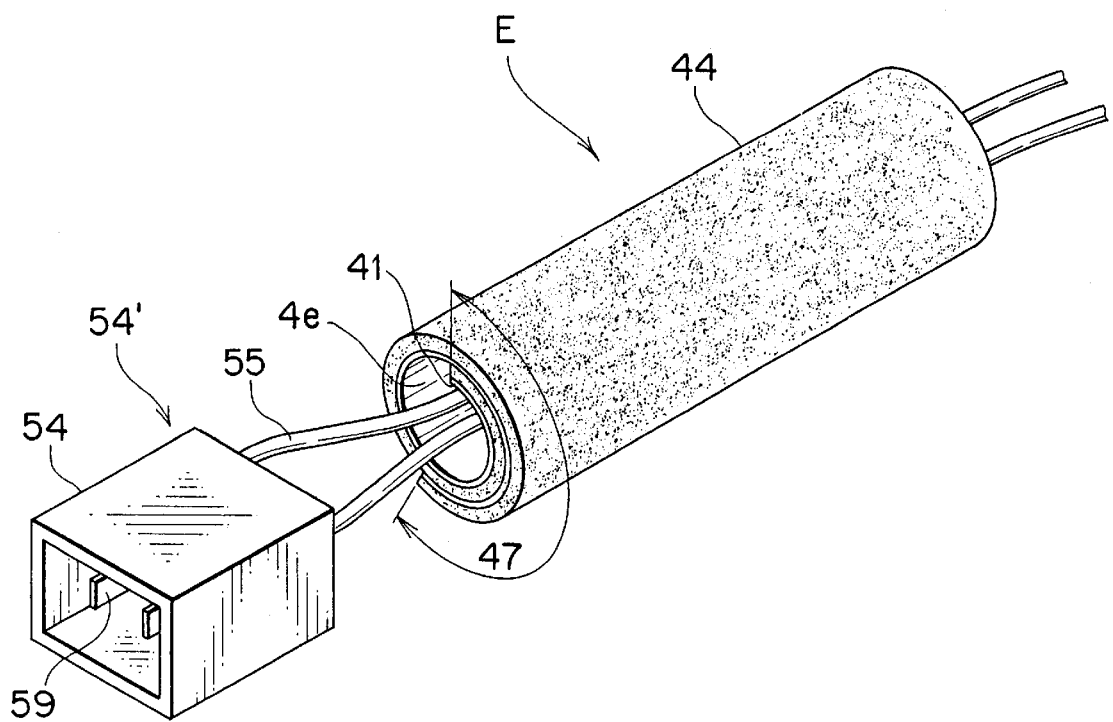
FIG. 16 is a perspective view of the tube for wiring harnesses of FIG. 14, with cables protected therein.

Thus, the tube E is easily fitted or sleeved over the cable(s) 55 or the wiring harness 50 by opening at the overlap portion 46 which, when closed, prevents the received cable(s) 55 or wiring harness 50 from falling off, as indicated with FIGS. 16 and 17. As compared with the described related art in which the terminals 59 attached to the cables 55 are first inserted through the tube 60 and then locked in the connector housing 54, the tube E is easily sleeved over the cables 55 from aside, making it possible for the terminals 59 to be first locked in the connector housing 54. Thus, with the tube E, the locking of the terminals 59 in position in the connector housing 54 can be done more rapidly than before.

Figure 17A:
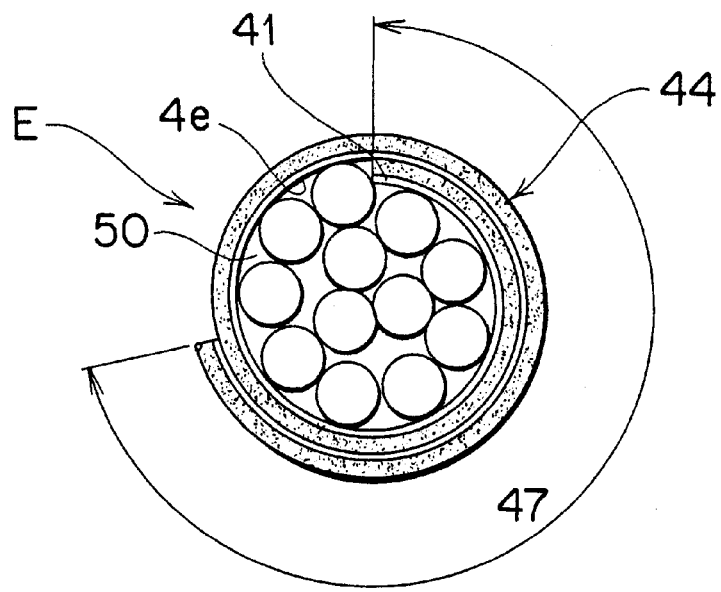
FIG. 17A is a sectional view of the tube for wiring harnesses of FIG. 14, with a small diameter wiring harness protected therein.
Figure 17B:
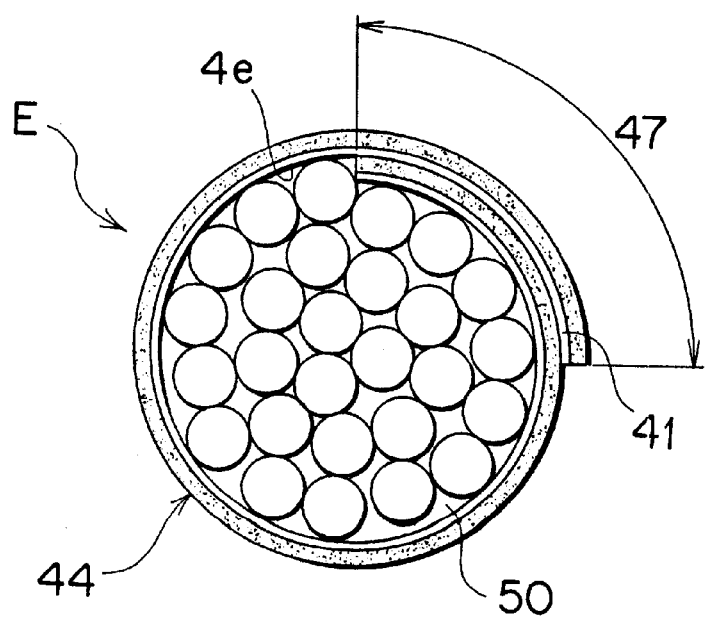
FIG. 17B is a sectional view of the tube for wiring harnesses of FIG. 14, with a large diameter wiring harness protected therein.

Further, because the circumferential dimension 47 by which the opposite end portions 45*a*, 45*b* of the tube E overlap each other is optionally settable, the circumferential dimension 47 can be easily selected so as to correspond to the outer diameter of the wiring harness, as shown in FIGS. 17A and 17B. Because one tube E can be used in common, making it unnecessary to provide different sizes of the tube E for wiring harnesses 50 of different outer diameters, a reduction is made in the production cost of the tubes.

FIGS. 18–28 show a tube for wiring harnesses according to a sixth embodiment of this invention.

In FIG. 18, a tube F for wiring harnesses consists of a spontaneously rolled cylindrical body 44 as in the preceding embodiment and an adhesive tape 70 wound around an outer peripheral surface 44*a* of the cylindrical body 44 so as to make the same smaller in diameter at a portion where the adhesive tape is wound.

The adhesive tape 70 is thin and flexible and is of such material as will not produce noises when hitting ambient parts in a vehicle (not shown).

Figure 19:
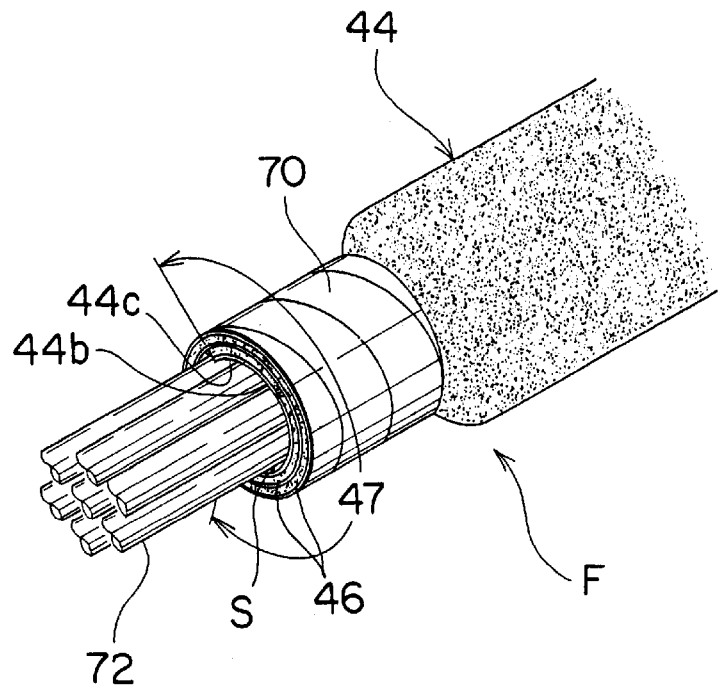
FIG. 19 is a perspective view of the tube of FIG. 18, with an adhesive tape wound around one end thereof.

Cables 72 constituting a wiring harness 71 are passed through the spontaneously rolled cylindrical body 44. The adhesive tape 70 is wound around opposite end portions 45*a*, 45*b* of the cylindrical body 44 to have their diameter reduced as shown in FIG. 19. Thus, the space in the cylindrical body 44 between the cables 72 and the inner circumferential surface 44*c*, shown at S in FIG. 20, becomes smaller than that present in the cylindrical body 44 before the winding of the adhesive tape 70 has been effected, as is indicated at S' in FIG. 21. This serves to restrict an axial movement of the cables 72 in the direction P and maintains the cables 72 in fixed position relative to the cylindrical body 44.

Further, the winding of the adhesive tape 70 protects the outer peripheral surface 44*a* of the cylindrical body 44 from wearing which would otherwise result after a long time of vehicle vibrations. The tube F for wiring harnesses thus has an improved resistance to wear. As a result, a suppression of the noises can be made which are caused when cables 72 exposed through a worn tube F for wiring harnesses hit ambient parts in the vehicle.

Figure 23:
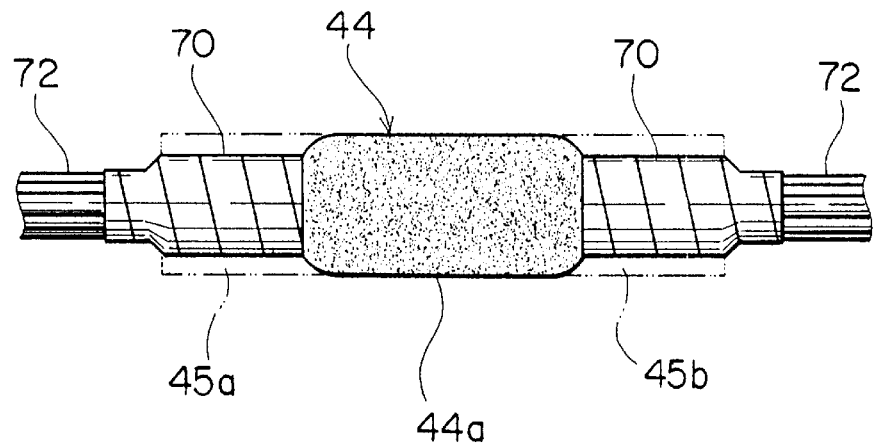
FIG. 23 is a view of the tube of FIG. 18, with the adhesive tape wound in an extended manner to the cables.

If the adhesive tape 70 is wound around the opposite end portions 45*a*, 45*b* of the cylindrical body 44 in an extended manner to the cables 72 as shown in FIG. 23, the axial displacement of the cables 72 relative to the cylindrical body 44 can be securely prevented, leading to a further improved resistance to wearing due to vehicle vibrations.

Further, without the adhesive tape 70, the cables 72 may get laterally out of the cylindrical body 44 during their mounting on a vehicle body due to their bending or external forces, and thus the fitting of the cylindrical body 44 over the cables 72 has been effected after the cables 72 have been mounted on the vehicle body. The winding of the adhesive tape 70 excludes the possibility of the cables 72 getting aside from the cylindrical body 44. As a result, the cylindrical body 44 can be fitted over the cables 72 during the production of the wiring harness and in advance to the assembling of the vehicle body, leading to a reduction in the number of assembling steps on the assembly line.

Figure 24:
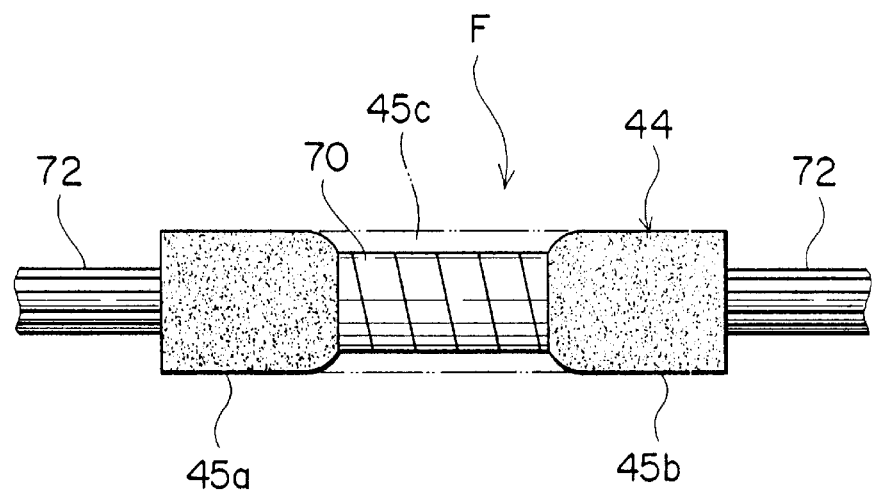
FIG. 24 is a view of the tube of FIG. 18, with the adhesive tape wound around an intermediate portion thereof.

The cylindrical body 44, after mounted on the vehicle, receives different strengths of vibrations or external forces at different portions thereof, depending on the location of the cylindrical body 44 in the vehicle. In the light of this, the adhesive tape 70 can also be wound at positions other than the opposite end portions 45*a*, 45*b* of the cylindrical body 44, as will be mentioned below.

Where the vibrations or external forces tend to focus on an intermediate portion 45*c* of the cylindrical body 44, the adhesive tape 70 is wound around the intermediate portion 45c, leaving the opposite end portions 45a, 45b uncovered, as shown in FIG. 24.

Figure 25:
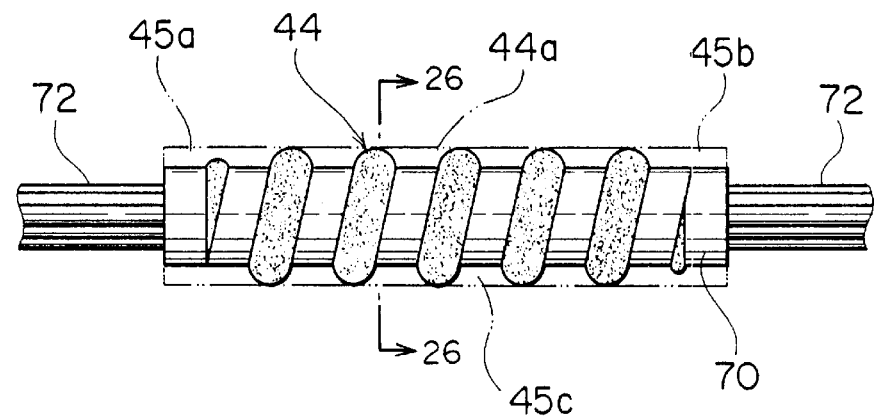
FIG. 25 is a view of the tube of FIG. 18, with the adhesive tape wound in a bellows-like manner therearound.

In this case, unlike the case where the adhesive tape 70 is wound around the opposite end portions 45a, 45b (FIG. 23), it can be wound up at a time without cutting in the middle.

Where the opposite end portions 45a, 45b and an intermediate portion 45c of the cylindrical portion 44 are acted with vibrations or external forces, the latter with relatively weak vibrations or external, the adhesive tape 70 is wound around the opposite end portions 45a, 45b and the intermediate portion 45c, on the latter in a bellows-like manner, as shown in FIG. 25.

Figure 20:
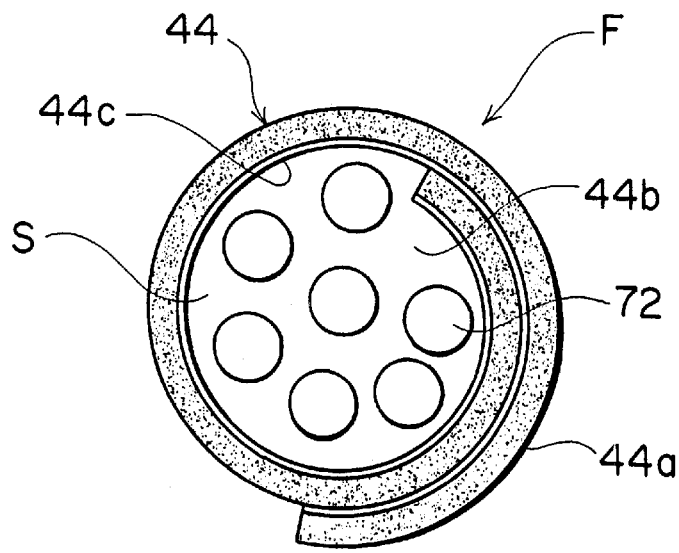
FIG. 20 is a sectional view taken along the line X—X of FIG. 18.
Figure 21:
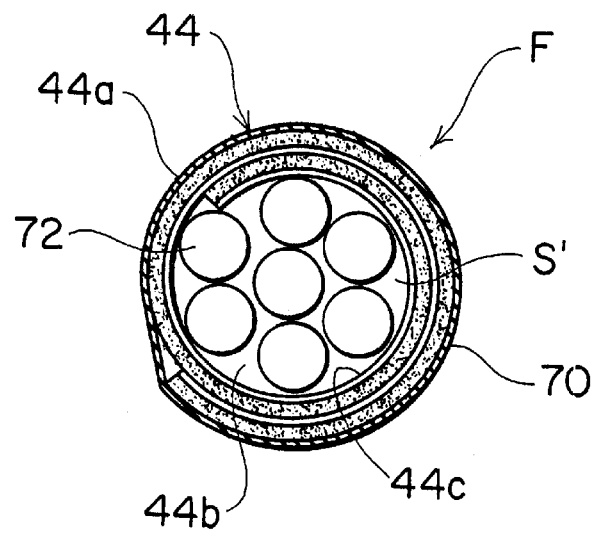
FIG. 21 is a sectional view taken along the line Y—Y of FIG. 18.
Figure 22:
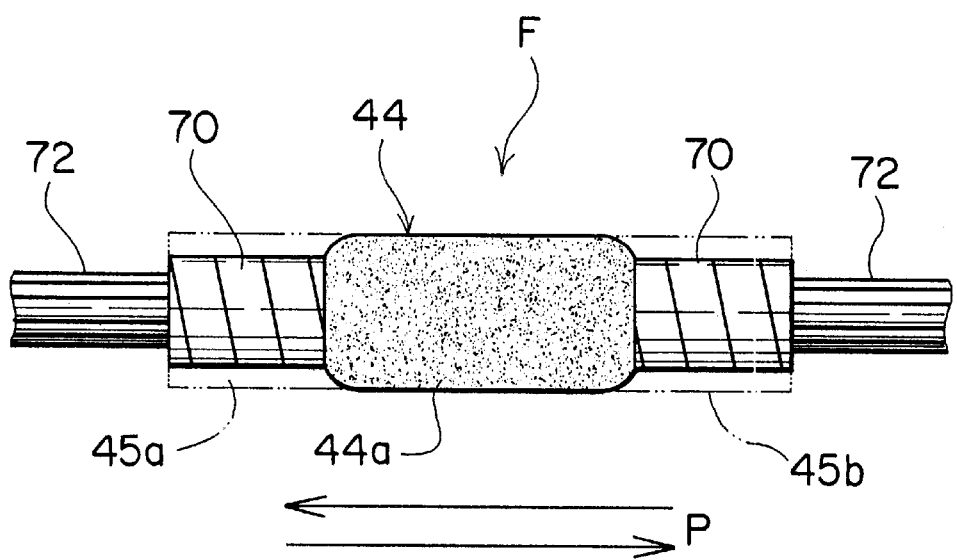
FIG. 22 is a view of the tube of FIG. 18, with the adhesive tape wound around opposite end portions thereof.
Figure 26:
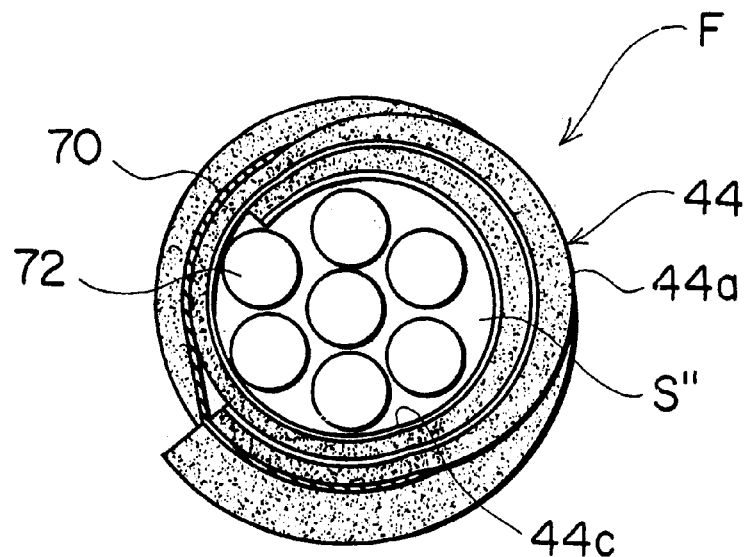
FIG. 26 is a sectional view taken along the line Z—Z of FIG. 25.
Figure 27:
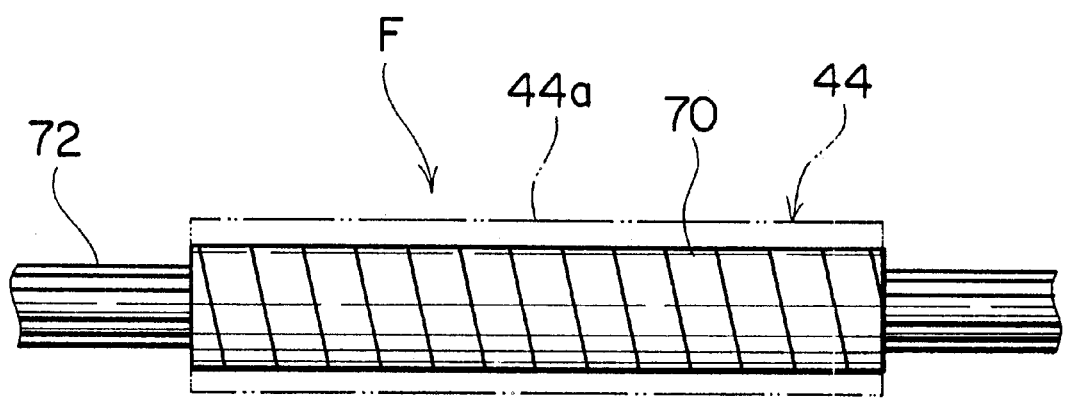
FIG. 27 is a view of the tube of FIG. 18, with the adhesive tape wound around the entire length thereof.
Figure 28:
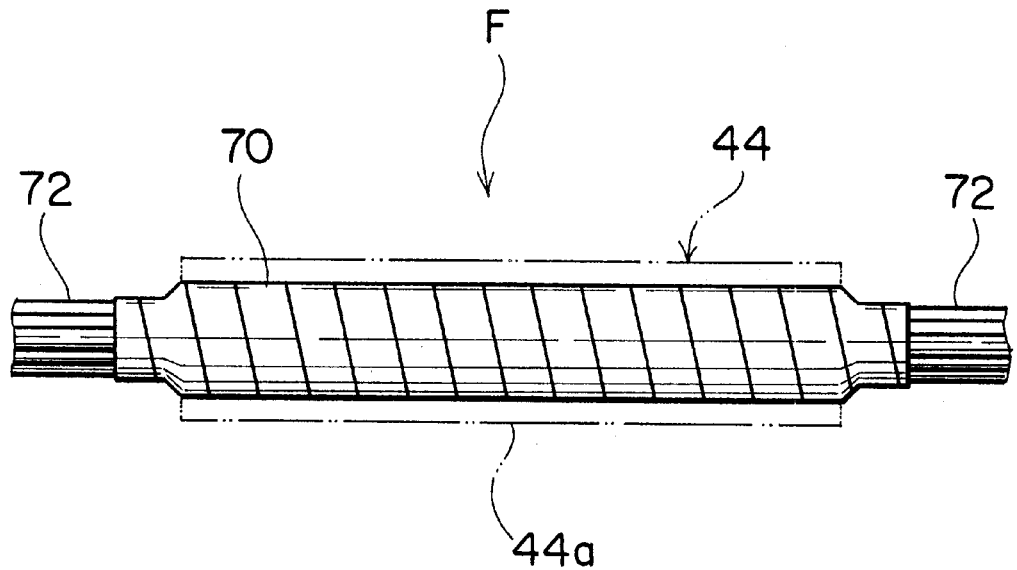
FIG. 28 is a view of the tube of FIG. 18, with the adhesive tape wound in an extended manner to the cables.
Figure 30:
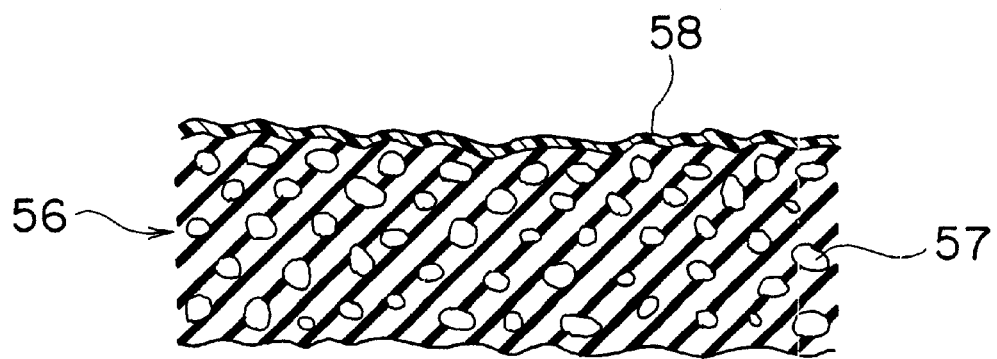
FIG. 30 is an enlarged sectional view of a part of the sheet of FIG. 29.
Figure 29:
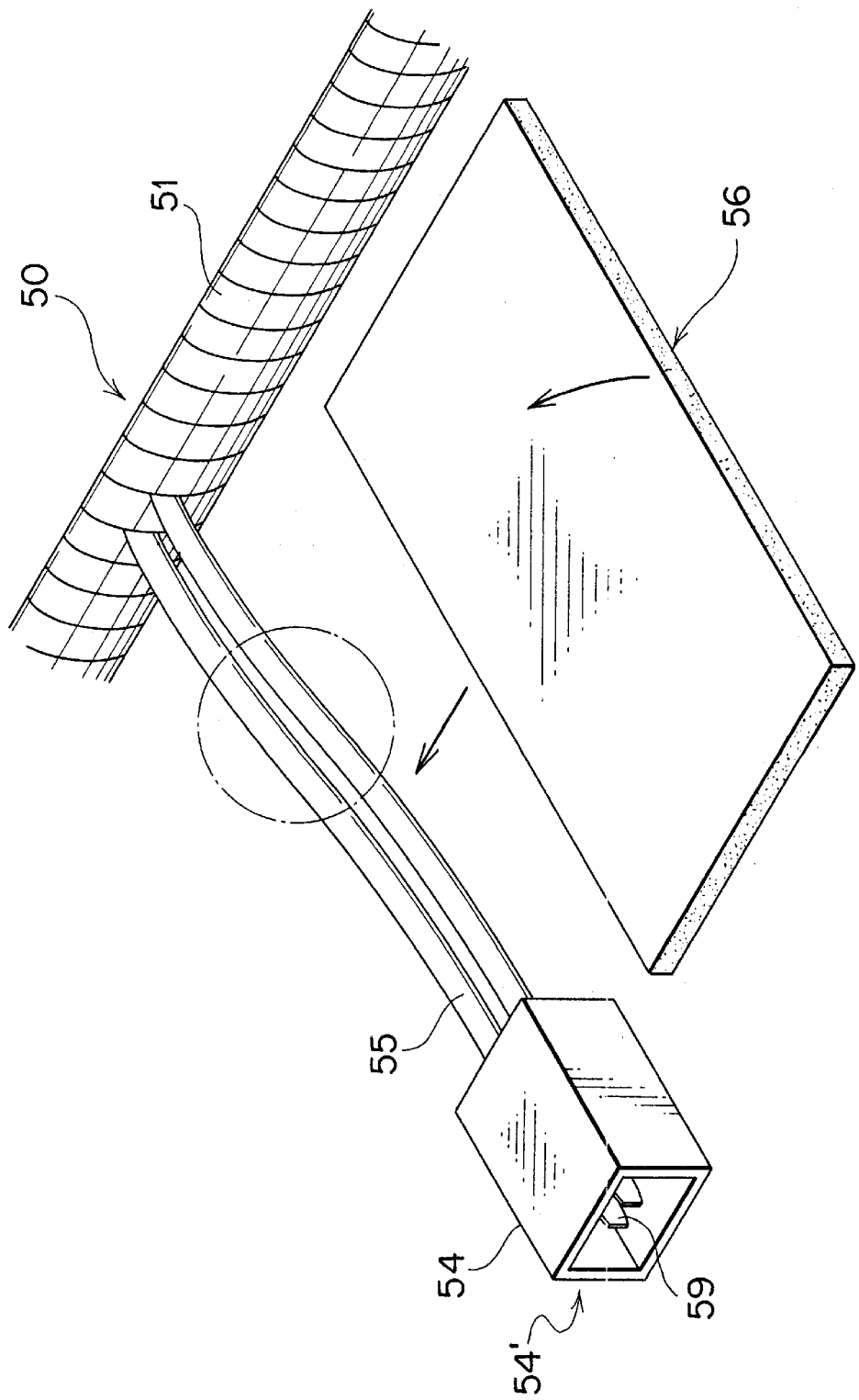
FIG. 29 is a perspective view of a conventional sheet for wiring harnesses about to be folded over cables branched from a wiring harness.
Figure 31:
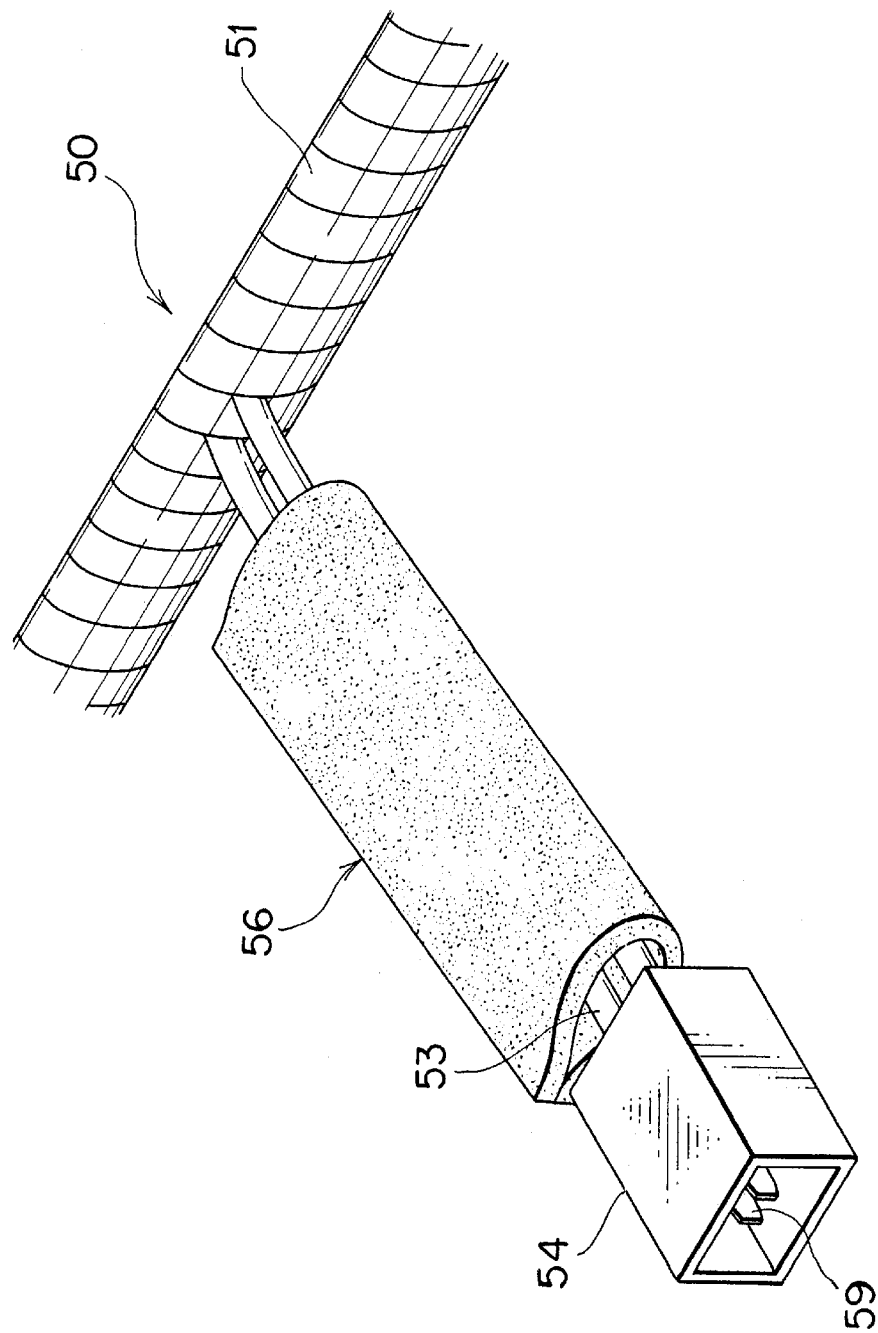
FIG. 31 is a perspective view of the sheet of FIG. 29 folded over the cables.
Figure 32:
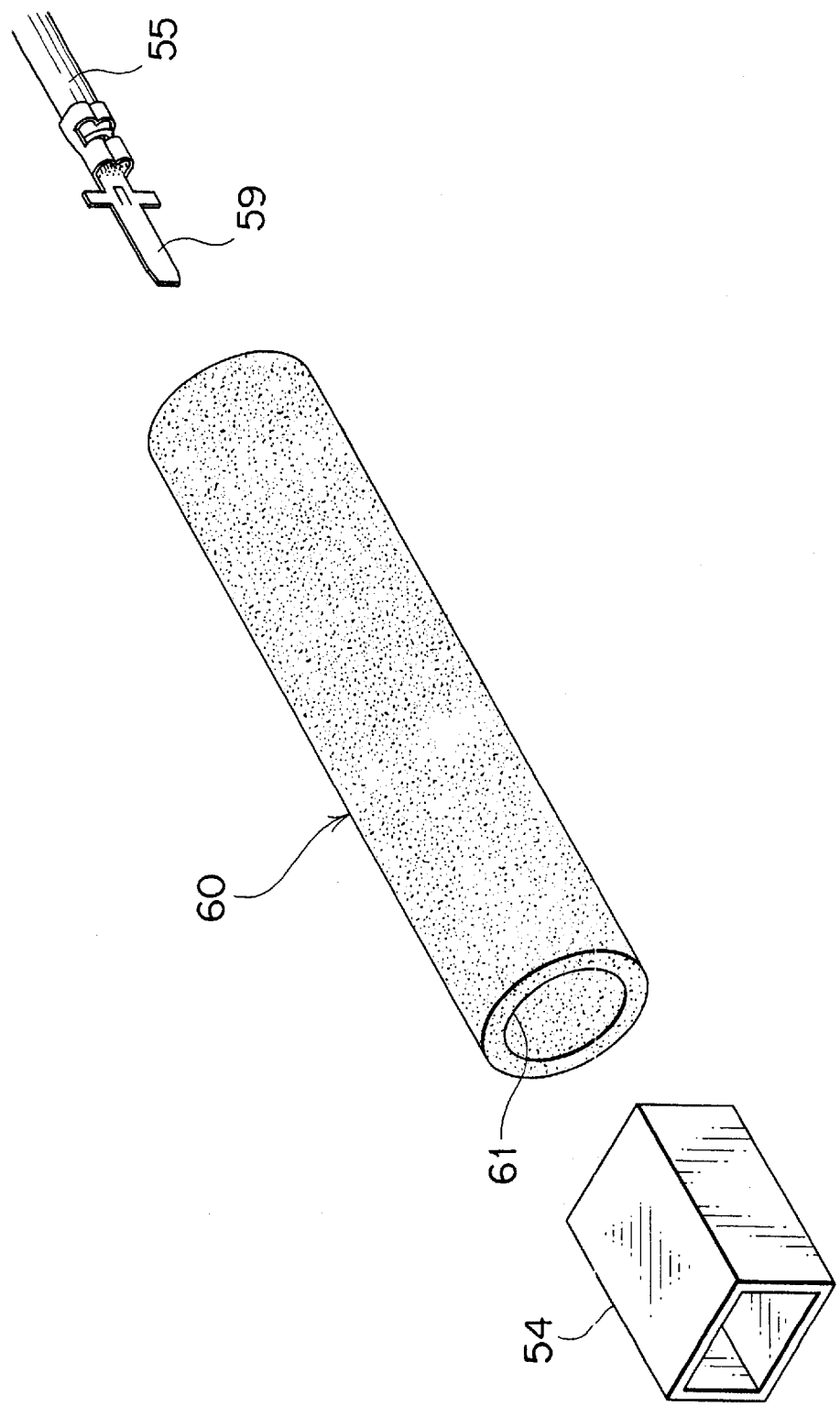
FIG. 32 is a perspective view of a conventional tube for wiring harnesses, shown with a cable about to be passed therethrough.

With this bellows-like arrangement, the space S" in the cylindrical body 44 between the inner circumferential surface 44c and the cables 72, as shown in FIG. 26, is smaller than the space S in FIG. 20, but larger than the space S' in FIG. 21 (S'<S"<S). The cylindrical body 44 with the adhesive tape 70 thus wound therearound can flexibly follow the cables 72 which possibly undergo bending when mounted on the vehicle.

Where the vibrations or external forces act on the entire length of the cylindrical body 44, the adhesive tape 70 is wound over such entire length of the cylindrical body 44 as shown in FIG. 27. The thus wound cylindrical body 44 has the highest resistance to wearing resulting from vehicle vibrations. Further, the space in the cylindrical body 44 between the cables 72 and the inner circumferential surface 44c is in this case the smallest, thereby most effectively suppressing the axial displacement of the cylindrical body 44 relative to the cables 72. The adhesive tape 70 may optionally be wound in an extended manner to the cables 72 as in the example shown in FIG. 28.

Having now fully described the invention, it will be apparent to one of ordinary skill in the art that many changes and modifications can be made thereto without departing from the spirit and scope of the invention as set forth herein.

What is claimed is:

1. A tube for wiring harnesses comprising:
    a cylindrical body for passage therethrough of at least one terminal-attached cable branched from a wiring harness, said cylindrical body being made of a foamed flexible sheet having a multiplicity of minute bubbles; and
    a cover means having a smooth, even and uncorrugated inner circumferential surface which smoothens an inner circumferential surface of said cylindrical body, wherein said at least one terminal-attached cable slides along said smooth, even and uncorrugated inner circumferential surface of said cover means when passing through said cylindrical body.

2. The tube for wiring harnesses according to claim 1, wherein said cover means comprises an applied film covering said inner circumferential surface of said cylindrical body.

3. The tube for wiring harnesses according to claim 2, wherein said applied film is of polyester.

4. The tube for wiring harnesses according to claim 2, wherein said applied film which covers said inner circumferential surface of said cylindrical body has a high heat shrinkability and thermosettability and becomes larger in thickness when heated and thereafter cooled.

5. The tube for wiring harnesses according to claim 4, wherein said applied film and thus said cylindrical body are used to directly cover an electric component such as a connector.

6. The tube for wiring harnesses according to claim 4, wherein said cylindrical body with said applied film is extended in accordance with a laying path of a wiring harness and is heated and thereafter cooled to be put in a shape following said laying path of said wiring harness.

7. The tube for wiring harnesses according to claim 1, wherein said cover means comprises a coated layer covering said inner circumferential surface of said cylindrical body.

8. The tube for wiring harnesses according to claim 7, wherein said coated layer comprises a flexible settable adhesive or a flexible resin.

9. The tube for wiring harnesses according to claim 1, wherein said cover means comprises a layer covering said inner circumferential surface of said cylindrical body, which is provided by fusing a'surface of said sheet constituting said inner circumferential surface of said cylindrical body at a temperature over a softening temperature thereof and allowing said surface of said sheet to cool.

10. The tube for wiring harnesses according to claim 9, wherein said surface of said sheet is applied with a pressure while being fused to provide said layer.

11. A tube for wiring harnesses comprising:
    a cylindrical body for passage therethrough of at least one terminal-attached cable branched from a wiring harness, said cylindrical body being made of a foamed flexible sheet having a multiplicity of minute bubbles; and
    a cover means having a smooth, longitudinally even inner circumferential surface which smoothens and makes longitudinally even an inner circumferential surface of said cylindrical body, wherein said at least one terminal-attached cable slides along said smooth, longitudinally even inner circumferential surface of said cover means when passing through said cylindrical body.

* * * * *